United States Patent Office 3,463,828
Patented Aug. 26, 1969

3,463,828
BIS(CYCLOALKENYL)-SUBSTITUTED OLEFINS
Donald L. Crain, Bartlesville, Okla., assignor to Phillips Petroleum Company, a corporation of Delaware
No Drawing. Continuation-in-part of application Ser. No. 502,544, Oct. 22, 1965. This application Sept. 5, 1967, Ser. No. 665,239
Int. Cl. C07c 3/10, 13/02
U.S. Cl. 260—666        10 Claims

ABSTRACT OF THE DISCLOSURE

Bis(cycloalkenyl) - substituted olefins prepared by contacting an alkenyl-substituted cycloalkene with a catalyst formed from a molybdenum- or tungsten-containing compound.

---

This application is a continuation-in-part of copending application, Ser. No. 502,544, filed Oct. 22, 1965, now abandoned.

This invention relates to a novel process resulting in the synthesis of bis(cycloalkenyl) - substituted olefins and to the novel products produced thereby. In one aspect this invention relates to a novel method for the production of 1,2-bis(3-cyclohexen-1-yl)ethylene.

Presently, there are no commercial processes known to the prior art to synthesize bis(cycloalkenyl)-substituted olefins in order to position the double bonds in a nonconjugated relationship.

It is known to pass 1,2 - bis(1 - hydroxycyclohexyl) ethylene at reduced pressure over alumina at a temperature range of 325 to 350° C. wherein it is dehydrated to 1,2 - bis(1 - cyclohexen - 1 - yl)ethylene. However, the double bonds in this compound are in the conjugated position. There is a decided advantage in being able to make bis(cycloalkenyl) - substituted olefins wherein the double bonds are in the nonconjugated position because compounds possessing such structure can be made to undergo conversions of greater latitude wherein the double bonds are reacted independently one of another.

It is therefore an object of this invention to provide a new process for the preparation of bis(cycloalkenyl)-substituted olefins.

It is another object of this invention to provide novel bis(cycloalkenyl)-substituted olefins.

It is still another object of this invention to provide a novel process for the preparation of 1,2 - bis(3 - cyclohexen-1-yl)ethylene.

Various other objects and many of the attendant advantages of this invention will be readily appreciated as the same becomes better understood by reference to the following detailed description.

According to the process of this invention, bis(cycloalkenyl) - substituted olefins are prepared by contacting an alkenyl-substituted cycloalkene with an alumina-supported molybdenum or tungsten catalyst under such conditions of temperature and pressure to obtain as high yield as possible of the desired bis(cycloalkenyl)-substituted olefins. I have discovered that it is possible to so manipulate or control the reaction conditions to avoid alkylation, polymerization and dehydrogenation reactions. Therefore the process of this invention is carried out by contacting one or more alkenyl-substituted cycloalkenes with a supported molybdenum or tungsten catalyst at a temperature of from 25–300° C., preferably from 75–200° C. for from about 0.5 second to 24 hours or longer depending upon the method of contact and the desired degree of conversion under pressures ranging from 0 to 1500 p.s.i.g. It is preferred to utilize a low conversion, below 50 percent for example, and more preferably below 25 percent so as to minimize further conversion of products to less desirable materials.

The alkenyl - substituted cycloalkenes which are converted to bis(cycloalkenyl)-substituted olefins are represented by the formula

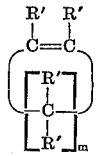

wherein one, and only one R' in the molecule is

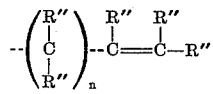

and wherein the remaining R's are selected from the group consisting of hydrogen and alkyl, aryl and cycloalkyl radicals and combinations thereof such as aralkyl and alkaryl containing from 1 to 10 carbon atoms, wherein R" is selected from the group consisting of hydrogen and alkyl, aryl, and cycloalkyl radicals and combinations thereof such as aralkyl and alkaryl containing from 1 to 10 carbon atoms, wherein each R" in the molecule can be alike or different, wherein m is an integer of from 3 to 10, inclusive, wherein n is an integer of from 0 to 4, inclusive, and wherein the total carbon atoms in one of said alkenyl-substituted cycloalkenes does not exceed 20. Preferred alkenyl-substituted cycloalkenes are those containing 6-membered rings, those which are nonconjugated and those whose alkenyl radical contains no branching at a carbon atom joined by double bonds.

Some specific examples of alkenyl - substituted cycloalkenes which can be converted to bis(cycloalkenyl-substituted olefins by the process of this invention are 3-vinylcyclopentene,
4-vinylcyclohexene,
2,3-dimethyl-4-vinylcyclohexene,
4-allylcyclooctene,
4-(3-butenyl)cyclodecene,
2-phenyl-6-(3-cyclohexen-1-yl)hexene-1,
3-cyclohexyl-4-vinylcyclohexene,
3-benzyl-4-(1-methylvinyl)cyclohexene,
4-(1-octenyl)cyclododecene,
5,5-diethyl-4-vinylcyclodecene,
4-(1-cyclohexen-1-yl)3,3-dimethylbutene-1,
1-methyl-4-(1-methylvinyl)cyclohexene,
3-methyl-5-(propenyl)cyclohexene,
3-methyl-4-(propenyl)cyclohexene,
3,4-dimethyl-5-vinylcyclohexene,
3,5-dimethyl-4-vinylcyclohexene, and the like, and mixtures thereof.

Examples of bis(cycloalkenyl)-substituted olefin products which are produced by this invention are characterized by the formula

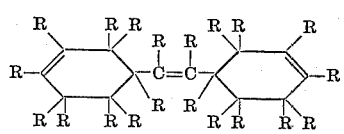

wherein R is at least one member selected from the group consisting of hydrogen, alkyl, aryl, cycloalkyl, aralkyl, alkaryl containing from 1 to 10 carbon atoms wherein the total carbon atoms does not exceed 20.

Some specific examples are as follows:

1,2-bis(2-cyclopenten-1-yl)ethylene,
1,2-bis(3-cyclohexen-1-yl)ethylene,
1,2-bis(2,3-dimethyl-3-cyclohexen-1-yl)ethylene, 1,4-bis(3-cyloocten-1-yl)butene-2,
1,6-bis(3-cyclodecen-1-yl)hexen-3,
5,6-diphenyl-1,10-bis(3-cyclohexen-1-yl)decene-5,
1,2-bis(2-cyclohexyl-3-cyclohexen-1-yl)ethylene,
2,3-bis(2-benzyl-3-cyclohexen-1-yl)butene-2,
1,2-bis(3-cyclodecen-1-yl)ethylene,
1,2-bis(1,1-diethyl-7-cyclodecen-1-yl)ethylene,
2,5-dimethyl-1,6-bis(1-cyclohexen-1-yl)hexene-3,
2,3-bis(4-methyl-3-cyclohexen-1-yl)butene-2,
1,2-bis(3-methyl-4-cyclohexen-1-yl)ethylene,
1,2-bis(2-methyl-3-cyclohexen-1-yl)ethylene,
1,2-bis(2,3-dimethyl-4-cyclohexen-1-yl)ethylene,
1,2-bis(2,6-dimethyl-3-cyclohexen-1-yl)ethylene,
1-methyl-1-(4-methyl-3-cyclohexen-1-yl) - 2 - (3 - cyclohexen-1-yl)ethylene.

The catalysts which are employed in the process of this invention are conventional supported molybdenum or tungsten catalysts; suitable supports include silica, alumina and alumina-containing compositions which contain minor amounts of other materials which are compatible with the reaction, such as small amounts of silica, titania, magnesia, cobalt oxide, and the like. The molybdenum or tungsten can be added to the support as a molybdenum or tungsten compound; for example molybdenum hexacarbonyl, tungsten hexacarbonyl, ammonium tungstate, molybdenum oxide, tungsten oxide, or molybdenum and tungsten materials convertible to the oxide on calcination can be used. Addition of the molybdenum or tungsten compound to the base can be carried out by such conventional methods as dry mixing, coprecipitation or imamong of molybdenum or tungsten present in the resulting composite catalyst, calculated as the oxide, will generally range from 0.1 to 30 weight percent, preferably 3 to 15 weight percent by weight of the total catalyst composition. Presently preferred are catalysts prepared by associating a molybdenum compound with alumina together with a small amount of an alkali metal compound.

The preparation and activition of the catalyst composite are conventional and can be effected in several ways. For instance, when employing molybdenum hexacarbonyl as a molybdenum-supplying compound, it is preferred to heat the chosen support, aluminum oxide, for example, to a temperature above 260° C., preferably at a temperature of from about 400° C. to about 800° C. in the presence of oxygen, generally for at least 5 minutes. Addition of Mo(CO)$_6$ to the support can be carried out by contacting this base with a hydrocarbon solution of the molybdenum compound, followed by heating under vacuum. In those instances when other molybdenum or tungsten compounds are utilized as the catalyst, impregnation of the bases with a dispersion of the molybdenum or tungsten compound is preferably carried out prior to heating as described hereinabove. Whatever molybdenum or tungsten compound is used, it is preferred to employ supports having a surface area o fabout 100–325 m.$^2$/gm., inclusive, or 100–300 m.$^2$/gm. Furthermore, in order to minimize the double bond isomerization which leads to wider variety of olefin products, it is preferred to employ nonacidic supports, alumina being the most preferred support. It is sometimes advantageous to incorporate small amounts of alkali or alkaline earth metal compounds into the catalyst prior to the heating step. Regeneration of the catalyst, when applicable, is accomplished by conventional means. For example, a spent catalyst, prepared from ammonium molybdate and alumina, is reheated in an oxygen-containing stream of gas for a sufficient time to restore its activity.

The process can be carried out in the presence or absence of an inert diluent with the amount of diluent generally ranging from 0–90 volume percent of the reaction mixture. Suitablediluents include saturated hydrocarbons such as alkanes and cycloalkanes. Some examples are cyclohexane, cycloheptane, hexanes, octanes, Decalin, and the like, and mixtures thereof.

It is within the scope of this invention that the process can be carried out. batchwise or as a continuous process in either the liquid or the vapor phase. Operation in the liquid phase is presently preferred. In a batch process, the catalyst will generally comprise from about 0.5 to about 25 percent by weight of the reaction mixture. When operating on a continuous basis, the catalyst can be employed as a fixed bed over which alkenyl-substituted cycloalkenes are passed at a suitable rate to obtain the desired conversions at the chosen reaction conditions.

One convenient bath method for carrying out the reaction is to employ a fixed bed catalyst positioned in a fractionation column above the kettle. Since the product bis(cycloalkenyl)-substituted olefins will, in most cases, boil above the charged alkenyl-substituted cycloalkene, feedstock can be charged to the kettle and vaporized up through the catalyst bed. The product will then reflux to the kettle and byproduct olefins can generally pass overhead. This method represents a combined reaction and separation method.

After the reaction period, the bis(cycloalkenyl)-substituted olefin product is separated and isolated from the unconverted alkenyl-substituted cycloalkenes and from the byproducts by any conventional means such as fractionation, liquid-liquid extraction, adsorption, and the like. For example when 4-vinylclclohexene is the feedstock, the ethylene byproduct can be removed as a gas and the 1,2-bis(3-cyclohexen-1-yl)ethylene product can be separated from the feed and other olefinic byproducts by fractionation.

Without intending to limit the scope of the invention the present invention will be illustrated hereinafter by the following examples.

EXAMPLE I

Two hundred grams of a pelleted cobalt molybdate on alumina catalyst containing 3.42 weight percent CoO, 11.0 weight percent MoO$_3$, and 85.6 weight percent Al$_2$O$_3$ was treated with 185 ml. of an aqueous solution containing 2.2 grams of KOH. After 30 minutes, the catalyst pellets were removed, dried under vacuum and heated to 500° C. for 5 hours.

A 500 ml. distillation pot was charged with 170 ml. (142 grams) of pure grade (Phillips) 4-vinylcyclohexene and covered with a nitrogen atmosphere. The pot was then placed on a distillation column which was filled with N$_2$ and which had a steady stream of N$_2$ flowing through it. The column was a 10 inch long x 18 mm. I.D. column which was filled to 5 in. with stainless steel packing. The head of the column was then removed, and 34.6 grams of the above-described catalyst was poured into the top of the column under a N$_2$ blanket, after which the head was replaced. The 4-vinylcyclohexenes was then refluxed through the catalyst bed for 2 hours, during which time a steady evolution of ethylene was noted, and the kettle temperature rose from 128° C. to 190° C. After 2 hours, the heat was turned off and the reaction mixture allowed to cool. The material absorbed on the catalyst was removed by refluxing the n-pentane through the column and catalyst bed and then evaporating the pentane. The combined products were then fractionated at reduced pressure, taking the unconverted vinylcyclohexene over into a Dry Ice trap.

This fractionation gave the following cuts:

| Cut | Vol. ml. | Wt., grams | Temp., ° C. | Pressure (mm.Hg) |
|---|---|---|---|---|
| 1 | 3 | 2.4 | 79 | 0.3 |
| 2 | 80 | 73.6 | 79–80 | 0.3 |
| Residue | | 10.3 | | |

The above catalytic conversion run was repeated several times and the fractionated product materials cuts (cut No. 2) obtained from each run were combined. An analysis of the sample of combined product by nuclear mangetic resonance (NMR) showed the material to be a mixture comprising 1,2 - bis(cyclohexen-1-yl)ethylene (BCE). An infrared analysis of the material indicated that the unsaturation other than that observed in the cyclohexene rings was essentially all of the trans configuration.

A 500 gram sample of the above-prepared mixture of 1,2-bis(cyclohexen-1-yl)ethylene (BCE) was carefully fractionated at 1-2 mm. absolute pressure, yielding a cut of 99.6 percent purity (as determined by gas-liquid chromatography).

GLC analysis [a] of fractionated material:

| | Purity, wt. percent BCE |
|---|---|
| First cut | 60 |
| Second cut | 98.4 |
| Third cut | 99.6 |

[a] 150 ft. Aplezon capillary programmed from 60–220° C.

An elemental analysis of the third cut material (99.6 percent purity) gave the following results:

ELEMENTAL ANALYSIS

| Element | Calculated for $C_{14}H_{20}$, wt. percent | Found, wt. percent |
|---|---|---|
| C | 89.3 | 89.3, 89.2 |
| H | 10.7 | 10.8, 10.8 |

An ultraviolet spectrum of the material showed it to be a nonconjugated olefin.

This third cut had the following physical properties:

| | |
|---|---|
| Density $d^{25}$ | 0.924 |
| $n_D^{20}$ | 1.5103 |
| B.P. at 1 mm. ° C | 90 |

A 1.0 ml. sample (0.9242 gram) of the 98.4 percent purity material was hydrogenated in glacial acetic acid, using prereduced $PtO_2$ catalyst at 755 mm. Hg absolute $H_2$ pressure, 25° C. and using hydrogen saturated with water vapor. Under these conditions, the sample absorbed 381.9 ml. of $H_2$. This is equivalent to 3.05 double bonds per molecule.

EXAMPLE II

In this example 4-vinylcyclohexen was converted to 1,2-bis(3-cyclohexen-1-yl)ethylene using a continuous reaction technique. A vertical glass reactor, ⅞ inch in diameter by 12 inches long, was charged with 30.5 g. (57.5 ml.) of a commercial molybdena-alumina catalyst. The catalyst contained 13.0 weight percent molybdena and had a surface area of 325 m.²/g., a pore volume of 0.52 cc./g. and a pore diameter of 64 Angstroms. Prior to its introduction in the reactor, the catalyst was treated with about 2 weight percent potassium hydroxide, and activated in essentially the same manner as the catalyst of Example I. The glass reactor was jacketed and utilized a refluxing heat exchange fluid in the jacket to maintain the desired temperature.

A gravity flow of 4-vinylcyclohexene was passed downwardly through the reactor at a liquid hourly space velocity of 1.4 v./v./hr., at 120–124° C., and at atmospheric pressure. (The vinylcyclohexene feed was conditioned by flash distilling from $FeSO_4·1H_2O$ to remove peroxides before contact with the catalyst.) During the course of the test run, byproduct ethylene was vented from a port at the top of the reactor. The product, other byproducts, and unconverted 4-vinylcyclohexene were recovered from the bottom of the reactor.

After 150 minutes of operation, a sample of the underflow from this reactor was taken and analyzed by gas-liquid chromatography. The conversion was found to be 46.4 percent. The ultimate yield of 1,2-bis(3-cyclohexen-1-yl)ethylene was found to be 80.9 mol percent. About 10.1 mol percent of other isomers of this product were also obtained as well as about 7.9 mol percent of heavy olefinic products. About 0.9 mol percent of isomers of 4-vinylcyclohexenes were also detected among the products. (Ethylene was not calculated as one of the byproducts.) The byproducts which were isomers of 1,2-bis(3-cyclohexen-1-yl)ethylene included olefin isomers of this material (also nonconjugated) as well as some skeletal isomers identified as 1-cyclohexenyl-3-cyclopentenylpropenes.

1,2-bis(3-cyclohexen-1-yl)ethylene (BCE) was brominated to produce 1,2-bis(3,4-dibromocyclohexyl)-1,2-dibromoethane by forming a mixture of 128 grams of BCE, 400 ml. of chloroform, 1500 ml. of ethanol, and 20 grams of aluminum chloride, cooling the mixture to below 15° C. and maintaining the temperature of the mixture below 15° C. during bromination by adding 327 grams of bromine dropwise to the mixture over a 2 hour period. After all the bromine has been added the mixture was warmed to room temperature and stirred for an additional 6 hours. The brominated BCE product was then recovered from this mixture and subjected to elemental analysis, the results of which were:

| | Weight Percent | | |
|---|---|---|---|
| | Carbon | Hydrogen | Bromine |
| Calculated | 25.2 | 3.0 | 71.8 |
| Found | 25.9 | 3.1 | 71.2 |

Polypropylene was prepared by polymerization of propylene in the presence of diethylaluminum chloride and a complex having the approximate formula

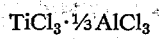

$$TiCl_3 \cdot \tfrac{1}{3} AlCl_3$$

This polymer contained the following stabilizers:

| | Weight percent |
|---|---|
| Ditertiarybutyl-p-cresol | 0.1 |
| Dioctylphosphite | 0.1 |
| 1,1,3 - tris(2 - methyl - 4-hydroxy-5-tertbutylphenyl) butane | 0.2 |
| Distearylthiodipropionate | 0.4 |

Antimony oxide and the 1,2-bis(3,4-dibromocyclohexyl)-1,2-dibromoethane (BrBCE) compound were mixed with the polymer fluff in an acetone slurry and the acetone was then evaporated with occasional stirring. The mixture was then blended under nitrogen in a Brabender plastograp for 10 minutes at 190° C. and 50 r.p.m. After blending the formulations were chopped and molded at 220° C. under 25 tons force (over the total platen area) into 5-inch x 5-inch x 0.125-inch slabs. These slabs were cut into bars 0.5-inch wide and tested for flame retardation by a method described in ASTM D635–56T. In this test the 5-inch bars are marked one inch from each end and burned 30 seconds at one end. If after two 30-second ignitions, the flame is extinguished before reaching the first mark, the formulation is considered "non-burning." If the flame reaches the second mark, the formulation is considered "burning." If the flame goes out between the first and second marks (that is, between one inch and four inches from the point of ignition), the formulation is considered "self-extinguishing," and the distance burned is reported as "extent of burning." The followin gtable illustrates the results of these tests.

Additive, p.h.p. (parts by wt. per 100 polymer).

| | |
|---|---|
| $Sb_2O_3$ | 1.0 |
| Brominate BCE | 2.0 |
| Classification | Non-burning |

When the brominated BCE is omitted from the above run and only the antimony oxide left in the polypropylene as a stabilizer, the polypropylene burns and therefore is given the classification of "burning."

Therefore, the brominated BCE renders the polypropylene fire resistant.

Variations and modifications of the materials and conditions may be made in the foregoing examples as will be obvious to those skilled in the art without departing from the scope of the present invention. It is intended that the patent shall cover by suitable expression in the appended claims the features of patentable novelty which reside in the invention.

That which is claimed is:

1. A method for synthesizing bis(cycloalkenyl)-substituted olefins which comprises contacting alkenyl-substituted cycloalkenes having the formula

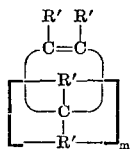

wherein one R' is

wherein the remaining R's are selected from the group consisting of hydrogen and alkyl radicals containing from 1 to 10 carbon atoms, wherein $m$ is 4, and wherein the total carbon atoms in one of said alkenyl-substituted cycloalkenes does not exceed 20, with an effective catalytic amount of a catalyst resulting from the admixture of one of molybdenum oxide, tungsten oxide, molybdenum hexacarbonyl, tungsten hexacarbonyl, ammonium tungstate, and molybdenum and tungsten materials convertible to the oxide on calcination and one of alumina- and silica-containing support under conditions of temperature and pressure sufficient to form bis(cycloalkenyl)-substituted olefins of the formula

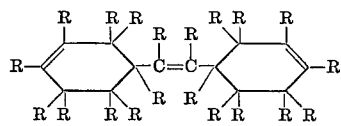

wherein R is at least one member selected from the group consisting of hydrogen and alkyl containing from 1 to 10 carbon atoms.

2. A method according to claim 1 wherein the said olefins are contacted with said catalyst at a temperature ranging from 25–300° C. and at pressures ranging from 0–1500 p.s.i.g.

3. A method according to claim 1 wherein the catalyst consists essentially of alumina and between 0.1 and 30 weight percent of molybdenum oxide.

4. A method according to claim 1 wherein the said olefin is contacted with the said catalyst in the present of a diluent.

5. A method according to claim 1 wherein the catalyst comprises from about 0.5 to about 25 percent by weight of reaction mixture.

6. A method according to claim 1 wherein 1,2-bis(3-cyclohexen-1-yl)ethylene is formed by contacting 4-vinylcyclohexene with a catalyst consisting essentially of from 3 to 15 weight percent molybdenum oxide and from 97 to 85 weight precent aluminum oxide which aluminum oxide has a surface area ranging from 100–300 sq. meters per gram at a temperature ranging from 75–200° C. for a period of time sufficient to obtain a 25 percent conversion and recovering the 1,2-bis(3-cyclohexen-1-yl)ethylene product.

7. A method according to claim 1 wherein 1,2-bis(2,3-dimethyl-3-cyclohexen-1-yl)ethylene is formed by contacting 2,3-dimethyl-4-vinylcyclohexene with a catalyst consisting essentially of from 3 to 15 weight percent tungsten oxide and from 97 to 85 weight percent alumina oxide which aluminum oxide has a surface area ranging from 100–300 sq. meters per gram at a temperature ranging from 75–200° C. for a period of time sufficient to obtain a 25 percent conversion and recovering the 1,2-bis(2,3-dimethyl-3-cyclohexen-1-yl)-ethylene product.

8. Bis(cycloalkenyl)-substituted olefins characterized by the formula:

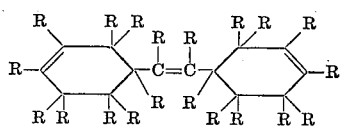

wherein R is at least one member selected from the group consisting of hydrogen and alkyl containing from 1 to 10 carbon atoms, and wherein the total carbon atoms does not exeed 20.

9. The composition according to claim 8 wherein said bis(cycloalkenyl) - substituted olefin is 1,2-bis(3-cyclohexen-1-yl)ethylene.

10. The composition according to claim 9 wherein said bis(cycloalkenyl) - substituted olefin is 1,2-bis(2,3-dimethyl-3-cyclohexene-1-yl)ethylene.

References Cited

UNITED STATES PATENTS 3,342,884  9/1967  Solomon.
3,395,189  7/1968  Kubicck.
3,395,190  7/1968  Tabler.

OTHER REFERENCES

R. Kuhn et al.: Berichte, 67, pp. 357–361, 1934.

H. J. Bestmann et al.: Chem. Berichte, 96, pp. 1899–1908, 1963.

Norman L. Allinger et al.: J. Amer. Chem. Soc., 86 pp. 2811–2819, 1964.

DELBERT E. GANTZ, Primary Examiner

V. O'KEEFE, Assistant Examiner